United States Patent [19]
Richardson

[11] 4,333,764
[45] Jun. 8, 1982

[54] NITROGEN-GAS-STABILIZED CEMENT AND A PROCESS FOR MAKING AND USING IT

[75] Inventor: Edwin A. Richardson, Houston, Tex.

[73] Assignee: Shell Oil Company, Houston, Tex.

[21] Appl. No.: 227,027

[22] Filed: Jan. 21, 1981

[51] Int. Cl.$^3$ .............................................. C04B 21/02
[52] U.S. Cl. .................................... 106/87; 106/90; 166/293; 166/294
[58] Field of Search ........................... 106/86, 87, 90; 166/293, 294

[56] References Cited

U.S. PATENT DOCUMENTS

| | | | |
|---|---|---|---|
| 3,591,394 | 7/1971 | Diggelmann et al. | 106/87 |
| 4,142,909 | 3/1979 | Gaines | 106/87 |
| 4,234,344 | 11/1980 | Tinsley et al. | 106/88 |

*Primary Examiner*—James Poer

[57] ABSTRACT

A hydraulic cement slurry which forms a gas-locked cement which contains microsized clefts that are filled with nitrogen gas and is both impermeable and non-shrinking is formed by dissolving in the slurry mix water a correlated amount of gas-forming reactants having a delayed rate of reaction such that the gas production occurs mainly at the time the volume of the slurry mix water is being reduced to a low value during the setting and hardening of the cement.

8 Claims, 7 Drawing Figures

NITROGEN-GAS-STABILIZED CEMENT AND A PROCESS FOR MAKING AND USING IT

BACKGROUND OF THE INVENTION

This invention relates to making and using an aqueous slurry of hydraulic cement. More particularly, it relates to providing such a slurry which contains nitrogen gas-forming reactants having concentrations and reaction rates which are correlated with the temperature and pressure in the zone to be cemented to provide a volume-stabilizing amount of gas production during substantially all of the setting and hardening of the cement.

Numerous patents and publications have appeared regarding foamed cements and their preparation and use. Such cements have been said to be useful as lightweight cements, construction materials, grouting materials, thermal insulating materials, non-shrinking cements, gas-impervious cements, fluid-permeable cements, and the like. The procedures for making and using such foamed or non-shrinking cements have included modifying conventional cement slurries by adding various hydrogen generating reactants, nitrogen generating reactants of numerous kinds, oxygen-generating reactants, water-swellable materials, and the like.

U.S. Pat. No. 2,163,207 relates to making cellular building materials by combining lime base binders with aqueous ammonia and hypochlorites (and optionally, peroxides) to produce gaseous nitrogen.

U.S. Pat. No. 2,191,555 relates to making porous cementious building material by adding to non-alkaline formulations (such as calcined gypsum plasters) an amide (such as urea) and a material which forms nitrous acid (such as a nitrite salt).

U.S. Pat. No. 2,288,556 relates to making a permeable cement by adding to a hydraulic cement slurry enough gas-generating material (such as powdered aluminum, calcium carbide, ammonium nitrite, or the like) to form a network of interconnected gas bubbles.

U.S. Pat. No. 2,371,928 relates to making porous materials from slurries, of cement gypsum or the like, by first mixing the cement with water, hypochlorite and filling material, then adding a pore-stabilizing substance (such as a soap or glue) along with hydrogen peroxide to generate gaseous oxygen.

U.S. Pat. No. 3,420,299 relates to preventing shrinkage during the setting of a cement slurry by adding pellets of a water-swelling material (such as bentonite) encapsulated in a material (such as a gel-like mud) to be ruptured when the cement slurry begins to harden.

U.S. Pat. No. 3,591,394 relates to making porous cement by adding to the cement slurry a "nitrogen delivering" compound (such as a diazonium compound) and an activator (such as sodium aluminate, potassium sulphate lead peroxide, sodium perbolate or the like) and mentions the desirability of delaying the onset of gas production until the slurry has been pumped into place.

U.S. Pat. No. 3,926,257 relates to making a foamed cement which is impermeable to gas by adding a foaming surfactant to the cement slurry so that any inflowing gas will form an immobile foam within the setting cement.

U.S. Pat. No. 4,142,909 relates to making a non-shrinking cement by adding to a hydraulic cement slurry a gas-generating compound which is capable of a controlled reaction without activators (such as azodicarbonamide, sodium azodicarboxylate, an organic peroxide, or sodium borohydride).

Numerous technical journal publications relate to the problems caused by gas leaking through a cemented annulus of a well borehole.

An article G. Carter and K. Slagle (of Halliburton) "A Study of Completion Practices to Minimize Gas Communication", September, 1972, JPT, page 1170, indicated that the problem was first recognized as being significant in the middle 1960s and two important factors for preventing the leakage are the maintenance of both a hydrostatic head greater than the gas pressure and a low fluid loss within the cement slurry.

An article by W. W. Christian, J. Chatterji and G. W. Ostroot of Halliburton, "Gas Leakage in Primary Cementing—A Field Study and Laboratory Investigation", November 1976, JPT, page 1361, mentioned that with deeper well completions across gas-producing horizons the problem of gas leakage was then a major concern and concluded that the lack of fluid loss control may be a primary cause of such leakage.

SPE Paper 8255, September 1979, "Annular Gas Flow After Cementing: A Look at Practical Solutions" (by representatives of Exxon and Texas A&M) concluded that a hydraulic pressure loss during the hydration reaction within the cement slurry is a primary cause of such leakage and the means for preventing it include cementing in short stages with slurries having different curing rates or using a foamed slurry containing gas bubbles that act as compressible pressure compensators during the hydration reaction.

SPE Paper 8257, September 1979, "Study of Factors Causing Annular Gas Flow Following Primary Cementing" (by representatives of Halliburton) indicated that the problems due to the pressure loss during the cement hydration can be removed by "an entrainment, addition, or in situ generation of a gas".

SPE Paper 8259, September 1979, "Flow After Cementing—A Field and Laboratory Study" (by representatives of Mobile and B-J Hughes) indicated that a cement slurry free water content of any significant magnitude is a significant factor (particularly in inclined boreholdes) capable of causing a gas flow after cementing.

Thus, the relatively recent journal publications indicate the desirability of having gas bubbles distributed uniformly within a cement slurry at the time the slurry is losing its ability to provide a hydrostatic pressure exceeding the pressure in an adjoining gas-containing reservoir. And, the issued patents show that it has long been known that numerous reactive compounds and procedures are available for causing numerous kinds of gas bubbles to be present within a cement slurry.

However, it is also known that (1) too little gas will provide insufficient compensation for the pressure loss during the hydration of the cement, (2) too much gas will cause the cement to have too much permeability and/or too little strength, (3) too early an inclusion of gas within the cement slurry will allow the gas to become non-uniformly distributed with respect to the other components of the slurry (which are much heavier and/or much more viscous than the gas), (4) too late an inclusion of the gas will fail to keep the reservoir gas from entering and channeling through the hydrating slurry before the cement has set and (5) the inclusion of a highly explosive gas such as hydrogen or a combustion-inducing gas such as oxygen will create a chemical situation which is difficult or dangerous to handle. And thus, the teachings of prior patents and publications are clear that a method for causing some sort of gas formation is desirable—but also show that no such method which is free of disadvantages that may be difficult or impossible to overcome has yet been disclosed.

SUMMARY OF THE INVENTION

The present invention relates to a pumpable aqueous slurry of hydraulic cement which contains, within its aqueous liquid phase, nitrogen gas-generating reactants which (a) consist of compounds that react while dissolved in that aqueous liquid (b) have a rate of reaction and a concentration within the aqueous liquid such that the rate at which they generate gas is relatively insignificant until their concentration within the aqueous liquid is increased by the loss of aqueous liquid which accompanies the setting of the cement and (c) are present within said aqueous slurry of cement in a proportion such that the volume of the gas generated by the reactants at least substantially equals the volume lost by the slurry during the setting of the cement.

In one preferred embodiment, the present invention relates to a process for compounding and emplacing a hydraulic cement within a selected zone to be cemented. A pumpable aqueous slurry of hydraulic cement components is compounded to form a slurry capable of being flowed into and cured within the zone to be cemented. Water-soluble reactant compounds, which are capable of reacting, while dissolved in an aqueous liquid, to produce nitrogen gas and by-products which are substantially inert to the components of the cement slurry and the cement it forms, are dissolved within the aqueous liquid phase of the slurry. The total concentration of the reactants within the cement slurry is correlated with the pressure and temperature within the zone to be cemented so that, at those conditions, the volume of the gas produced by the reactants substantially equals the volume lost by the slurry during the setting (or curing) of the cement. The rate at which the reactants react within said aqueous liquid is correlated with the temperature in the zone to be cemented so that, at that temperature and at the initial concentration of the reactants in the aqueous liquid, the amount of gas which they can produce between the times of the compounding of the slurry and the initial setting of the cement is significantly less than the total amount they are capable of producing. The so-compounded slurry is then promptly flowed into the zone to be cemented and maintained substantially quiescent. The volume of the aqueous liquid phase of the slurry is reduced during the setting of the cement. This concentrates the reactants within the remaining aqueous liquid and increases the rate at which the reactants generate gas. As a result of the gas generation, the solidifying cement becomes both impermeable and permeated with nitrogen gas-filled microsized clefts or creases and the bulk volume of the setting and set cement remains substantially equal to that of the slurry.

DESCRIPTION OF THE INVENTION

It has now been discovered that certain types of nitrogen-generating reactive compounds can be used in a novel way in order to form an aqueous slurry of hydraulic cement that will solidify without shrinking. Such a slurry can be formed by using reactants which react while they are dissolved within the aqueous liquid phase of a cement slurry. The concentration of those reactants within that aqueous liquid and within the cement slurry as a whole should be correlated with the pressure and temperature of the zone in which the cement is to be solidified. The total concentration of those reactants should be such that the volume of the gas they generate is capable of substantially matching the volume lost by the slurry during the setting of the cement. In addition, the rate at which those reactants react to form the gas should be kept slow until the beginning of the initial setting of the cement. At that time, the rate of the gas-production should be increased so that the volume of the gas is kept substantially equal to the volume lost by the slurry. Where such reactants are aqueous liquid-phase solutes, their concentration is increased by the loss of the solvent liquid. And, it has now been discovered, the rate of that increase in concentration is capable of increasing the rate of gas production to the rate needed for stabilizing the volume of the slurry and the cement it forms.

The present process causes a pumpable liquid slurry (which is initially capable of transmitting the full hydrostatic pressure of a column of liquid) to be converted to an initially and finally set cement having a gas stabilized bulk volume substantially equalling that of the slurry. This stabilization is due to the forming of nitrogen-gas-filled microsized clefts or creases within the body of the solidified cement. Since the amount of gas which is so contained is very small, such a gas stabilization is not likely to cause any significant loss of compressive strength or density nor any significant increase in permeability. No such losses or permeability increases have been indicated by the testing of the invention.

Testing System

Figure 1:
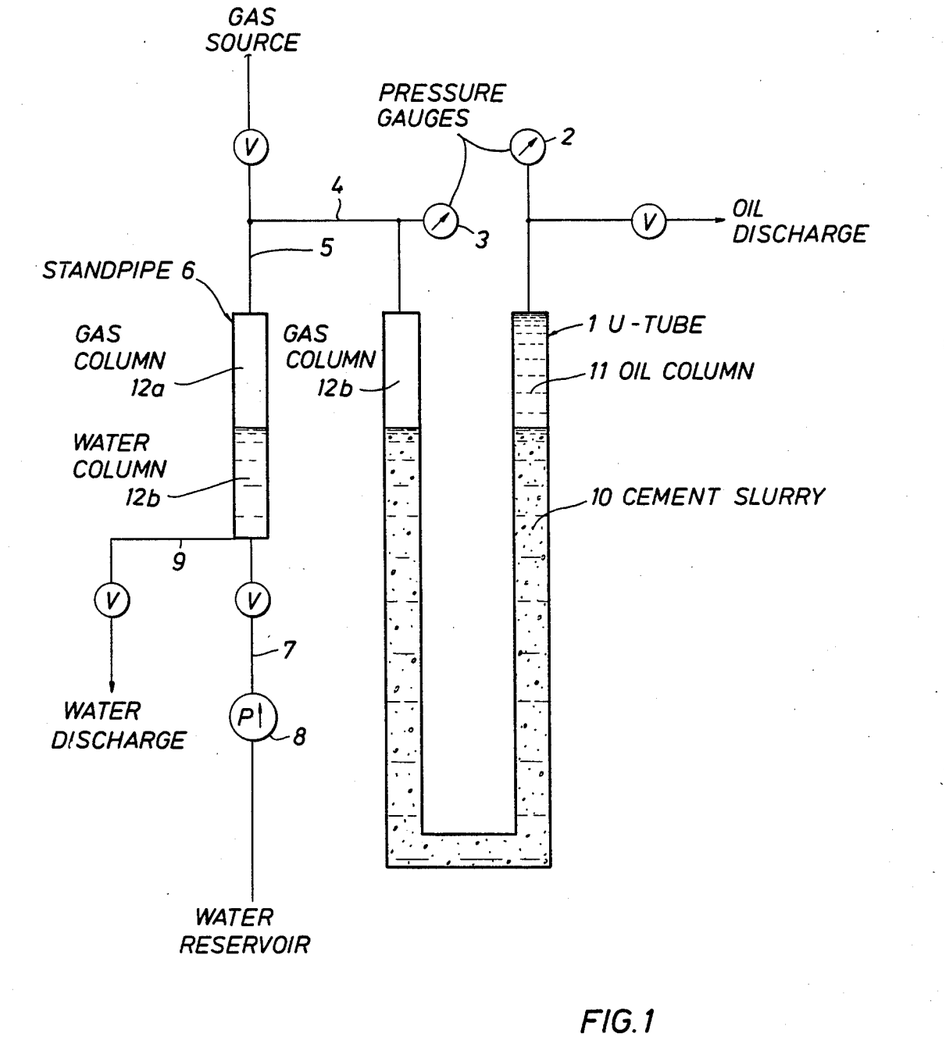
FIG. 1 is a schematic illustration of an apparatus for testing the behavior of a column of cement slurry relative to an inflow of gas and the transmission of pressure through the slurry.

FIG. 1 shows a cement slurry testing apparatus. The apparatus includes a pressureresistant Utube 1. The upper portions of the U-tube legs are connected to pressure gauges 2 and 3. The left leg is connected to a valved conduit 4 leading to a gas source (not shown). A branch 5 of the conduit 4 extends into a standpipe 6 having a lower end connected, through a valved line 7, to a water pump 8. The water pump intake is connected to a water reservoir (not shown). The lower end of the gas/water standpipe 6 is also connected to a valved line leading to a water discharge.

In measuring the properties of a cement slurry, 10, a sample of the slurry is placed in the U-tube. In the right hand leg, a body of oil 11 is placed between the top of the cement slurry and the pressure gauge 2. An inert gas is injected to form a gas column 12(a) in the upper portion of the standpipe 6 and a gas column 12(b) in the upper portion of the left leg of the U-tube. The gas is pressurized to the pressure selected for the testing of the cement slurry.

The cement slurry is kept static within the U-tube, at the selected temperature and in contact with the externally pressurized gas (preferably nitrogen) at the selected pressure, throughout at least the initial setting or curing of the cement. The water pump 8 is operated to maintain the selected pressure, for example, by repetitively injecting or allowing a backflowing of enough water to maintain the selected gas pressure. For example, the pump may inject water when the pressure falls to 310 and stop when it rises to 340 psig.

In such a procedure, with the pressure being kept substantially constant, the volume of water which is injected corresponds to the volume of gas which has flowed through the top of the gas-containing leg of the U-tube and into the column of cement slurry. The volume of this gas can readily be measured by measuring the amount of water withdrawn from the water reservoir, and/or by measuring the amount of water injected into the standpipe 6. The volume of any gas which is generated within the cement slurry at a rate sufficient to increase the gas pressure can similarly be measured by measuring the amount of water that is displaced back through the pump. The pressure gauge 2 monitors any variation in the pressure in the oil-containing leg of the U-tube, while the gauge 3 similarly monitors the pressure in the gas-containing leg.

Substantially any alternative testing chamber can be used in place of the U-tube 1 and associated equipment shown in FIG. 1 as long as the test chamber is arranged so that a sample of cement slurry can be positioned within the chamber so that it fills a rigid-walled tubular portion while a body of gas is maintained within the chamber so that is is in contact with and confined by the slurry and means are provided for maintaining the gas and slurry at a selected temperature and pressure and measuring the amount of gas which flows into the space initially occupied by the cement slurry. For use in measurements at relatively high pressures, it may be desirable to avoid the need for a very thick-walled chamber by surrounding the whole of the testing chamber with a liquid-filled vessel which is capable of safely confining the gas pressure to be used. It is convenient to dispose a body of mobile liquid such as the oil column 11 of FIG. 1 on the opposite side of the portion of cement slurry which is in contact with a body of pressurized gas in order to facilitate the bleeding down of the fluid pressure whithin the test chamber on the side of the cement slurry opposite the side contacted by the gas so that a gas pressure gradient is formed across the body of the set cement, in order to determine the rate of gas-leakage. In general, such a mobile fluid can be substantially any which has a relatively low viscosity and does not affect curing properties of the cement. Similarly, the pressurized gas can be substantially any which is inert to the curing of the cement and has PVT properties making it feasible to determine the volume changes within the slurry which correspond to a gas flow into or out of the space initially occupied by the cement slurry.

Gas Flow Control at 72° F. and 340 psig

Figure 2:
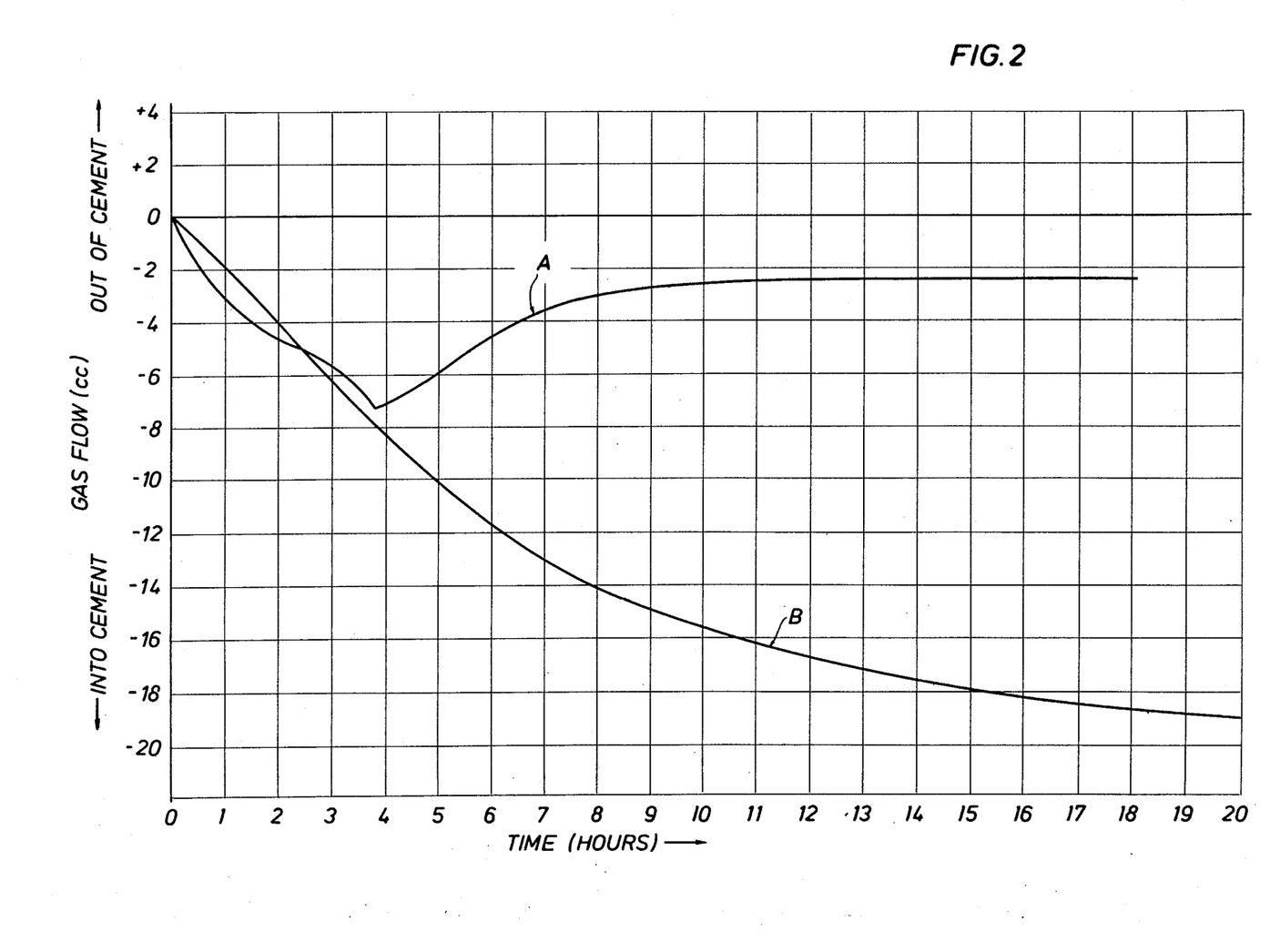
FIG. 2 shows variations with time in the flow of an externally pressurized gas into and out of a column of cement slurry while the cement is setting.

FIG. 2 illustrates a plot of the amount of gas flow with time between the upper portion of the gas leg of the U-tube and the volume occupied by the cement slurry being tested. The U-tube used had an internal diameter of 1" and a length of 80" and was maintained at 72° F. The externally pressurized gas was nitrogen and was maintained at a pressure between 310 and 340 psig.

The curves A and B relate to the performance of two samples of aqueous pumpable slurries of Class H hydraulic cement. The slurries each contained 40% by weight of $H_2O$, 2% by weight of calcium chloride (accelerator) and 1% by weight of HLXC 249 (fluid loss control agent available from the Halliburton Company). The slurries tested differed only in that the slurry represented by Curve A contained stoichiometric proportions of hydrazine and hydrogen peroxide sufficient for generating 0.055 moles per liter of nitrogen gas. The initial similarity and subsequent divergence of Curves A and B shows that the initial behavior of both of the slurries was substantially identical throughout most of the first four hours. In both cases the externally pressurized gas flowed into the slurry at about the same rate.

Such an inflow of externally pressurized gas appears to be due to a shrinkage in the volume of the slurry. This may be due to portions of the mix water being utilized in hydrating the cement, and/or may be due to some other type of conversion of slurry components to solids that are less voluminous.

It should be noted that initially, and throughout a significant proportion of this period, the cement slurry is enough like a liquid to transmit a hydrostatic pressure plus any externally applied pressure to any material contacted along the column of the slurry. Thus, for example, in the annulus of a wellbore which encounters a subterranean gas sand, an entry or initial inflow of the externally pressurized reservoir gas into the volume occupied by the cement slurry would be, ordinarily, prevented by the hydrostatic head existing within the adjacent portion of the column of cement slurry.

In the experiments shown in FIG. 2, the initial setting of each sample of cement took place within about four hours. But, as indicated by the abrupt decrease (in Curve A) in the rate of the gas flow into the cement slurry containing the gas-generating reactants, the rate at which gas was being internally generated was then accelerated to such an extent that, for about the next four hours, little or externally pressurized gas was able to flow into the setting and set cement. In fact, during that period there was some gas flow away from the cement (or cement slurry), and thus back into the body of externally pressurized gas (mainly in gas columns 12(a) and 12(b) of FIG. 1) due to gas being generated internally at a rate slightly greater than needed to fill the volume lost by the shrinking of the cement slurry. As shown by the levelling off of the curve A after a curing time of about seven hours there was substantially no further gas flow into or out of the cement slurry that contained the gas-generating reactants. In contrast, as shown by curve B, in the conventional type of slurry there was a steady inflow of gas into the slurry and that flow was continued (through a visible gap between the pipe wall and the solidified cement) after the setting of the cement.

Shrinking Control at 72° F. and 340 psig

Figure 3:
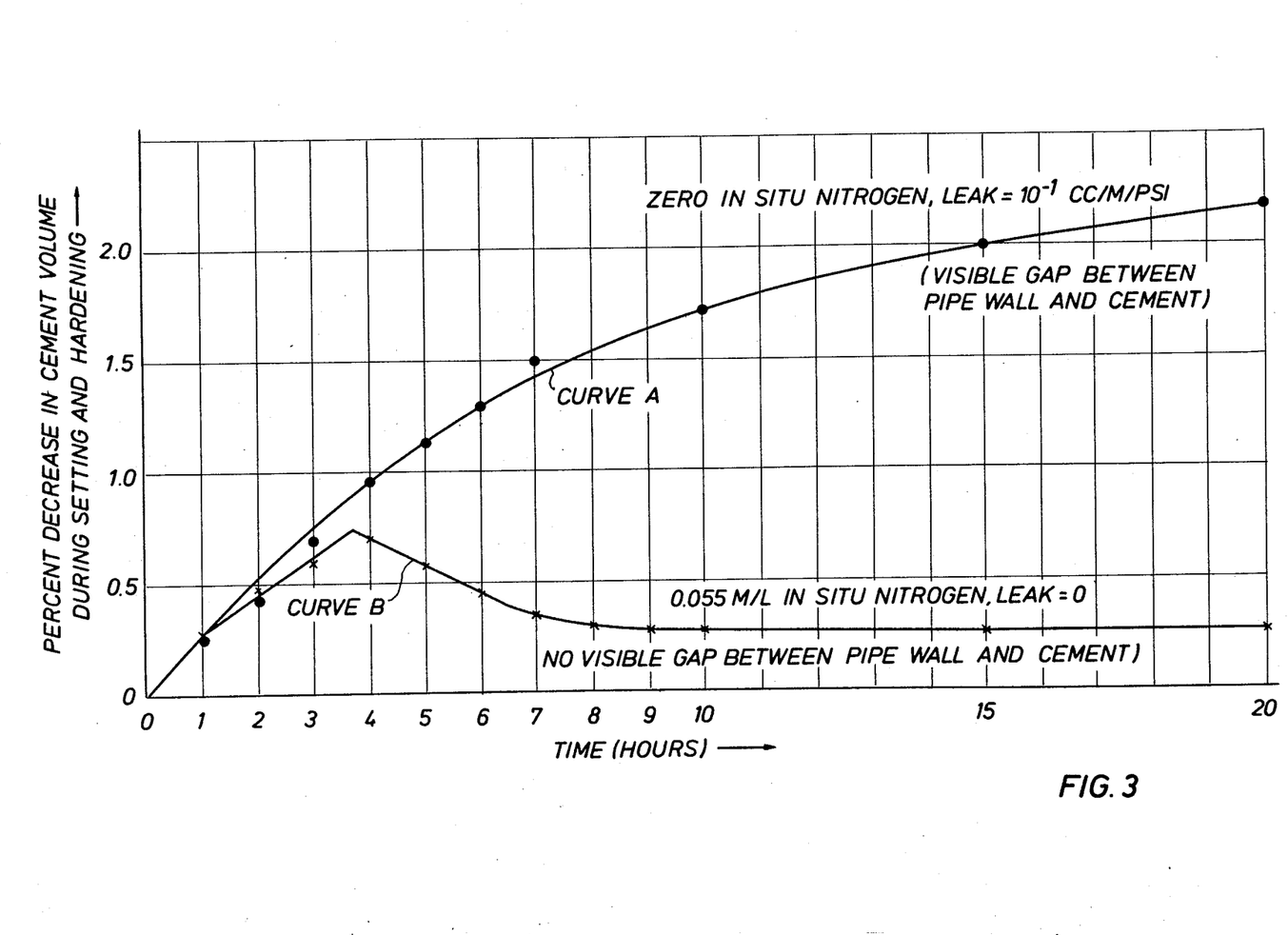
FIG. 3 shows the percent decrease with time in the volume of a cement slurry during the setting and hardening of the cement.

FIG. 3 shows a graph of the percent decrease with time of an aqueous slurry of hydraulic cement while the cement is setting. The cement used and the test conditions are those described regarding FIG. 2.

Curve A shows the percentage of shrinking (which is, of course, directly related to the amount of externally pressurized gas which flows into and out of the cement slurry) exhibited by such a slurry containing no gas-generating reactants. After about 20 hours, when that cement was thoroughly set and hardened, oil was drained from the oil containing leg of the U-tube apparatus of FIG. 1 so that the pressure on that leg of the column of cement was reduced to atmospheric. This subjected the column of cement to a pressure gradient of about 340 psi and induced a relatively high rate of leaking amounting to 0.1 cc per minute per psi and caused a gap to be visible between the pipe wall and the cement.

Curve B shows the percentage shrinking of the same cement slurry containing hydrazine and hydrogen peroxide reactants for generating 0.055 moles per liter of nitrogen gas. It shows that from about 4 to 8 hours after the start of the test (when a flow of gas out of the cement slurry is shown on curve A of FIG. 2) the cement regained much of the volume which was lost during the first 1 to 4 hours of the test. The cement volume then became constant at a value such that there was no visible gap between the pipe wall and the cement. That body of cement permitted no measurable leakage of gas (i.e., less than $1 \times 10^{-6}$) in response to a pressure differential of 340 psi.

Gas Flow Control at 180° F. and 2000 psig

Figure 4:
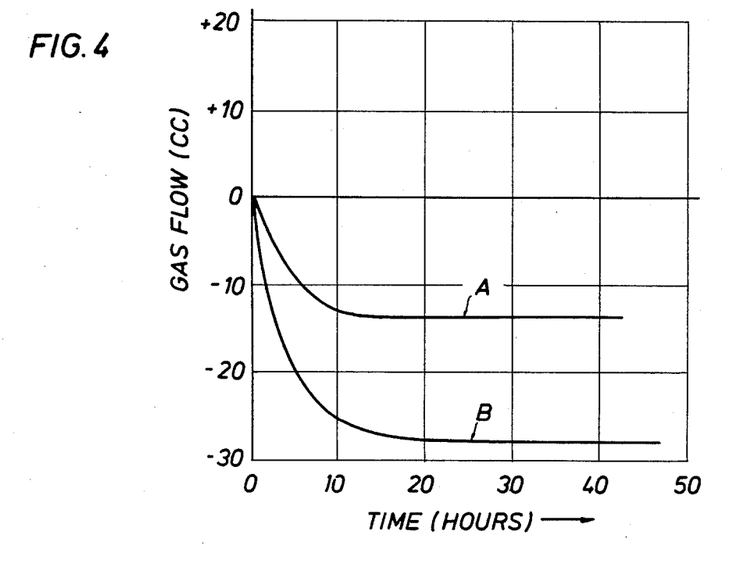
FIGS. 4 and 5 show variations with time in the flow of externally pressurized gas into and out of a column of cement slurry while the cement is setting and hardening.

FIG. 4 shows a plot (similar to that of FIG. 2) of the flow of gas into or out of the volumes occupied by columns of comparable cement slurries while they are standing at 180° F. in contct with an externally pressurized gas at 2000 psi. Such tests were conducted as described regarding FIG. 2.

The slurries used regarding FIG. 4 were comparable Class H cement slurries containing 40% by weight of water and conventional accelerators and fluid-loss retarders. From times starting substantially as soon as the slurries were flowed into the U-tube 1 of the apparatus shown in FIG. 1, the slurries were each subjected to an externally pressurized gas which was maintained at substantially 2000 psi (plus or minus about 20 psi).

Curve A shows the performance of such a slurry containing 0.66 moles per liter of hydroxylamine hydrochloride plus 0.66 moles per liter of sodium hydroxide (to neutralize the HCl). Curve B shows the performance of substantially the same slurry without the gas-generating reactant.

Curve A shows that, during the first four hours, there was an initial gas flow into the volume occupied by each of the slurries. But, after about 4 hours, the rate at which gas was being generated within the slurry of curve A became sufficiently rapid to prevent any further inflow of the externally pressurized gas into the volume initially occupied by the slurry. Such an inflow was prevented throughout a testing period of about 40 hours.

On the other hand, Curve B shows that the externally pressurized gas flowed continuously into the volume occupied by the slurry devoid of the gas-generating reactants. In addition, after allowing about 40 hours for the setting and hardening of the cement, tests were made for the gas leakage through the U-tubes plugged by the slurries. A 100 psi (pounds per square inch) pressure differential was applied across the legs of the U-tubes. This caused a gas flow past the plug formed by the cement slurry of curve B at a rate of 0.22 cc per minute (with the volume of the gas being measured at _0° C. and 14.7 psi absolute). Under the same conditions the cement slurry designated by curve A allowed no flow of gas past the cement plug.

Gas Flow Control at 200° F. and 2000 psig

Figure 5:
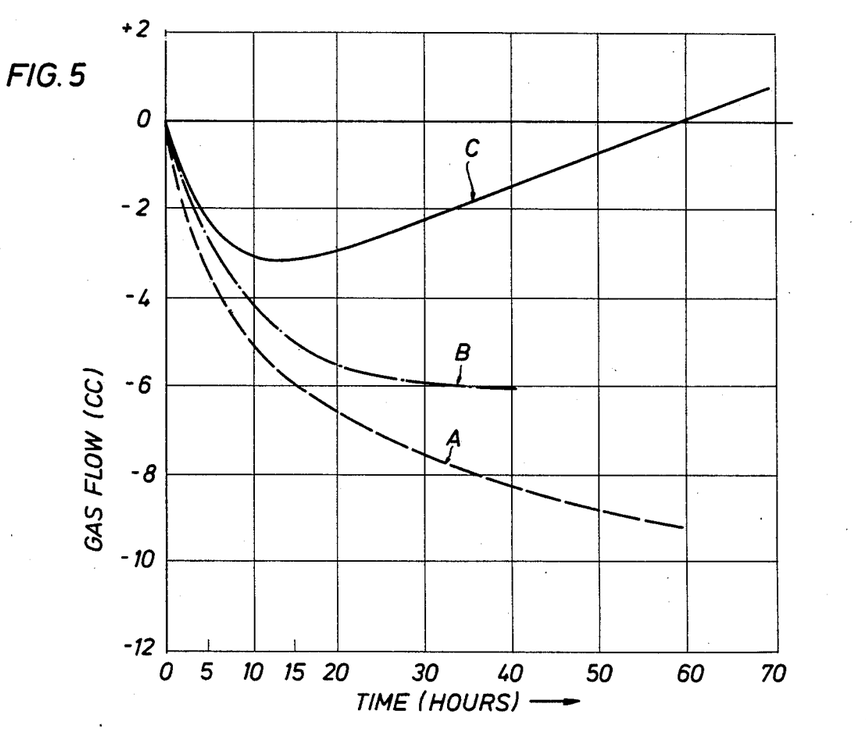

FIG. 5 shows a similar plot of similar flows of gas into and out of comparable slurries of Class H cement while the cement was being set at 200° F. in contact with an externally pressurized gas being maintained at substantially 2000 psig.

Curve A shows the performance of a cement slurry free of internal gas-generating reactants. After being allowed to set and cure for about 65 hours, the cement plug formed by that slurry permitted the leakage of gas across it at a rate of 0.015 cc per minute per pound per square inch in response to a 300 psi differential across the cement plug (with the volume of the gas being measured at 2000 psig and 20° C.).

Curve B shows the performance of the same slurry modified by the addition of an amount of hydrazine which is equivalent to 0.33 moles per liter of gaseous nitrogen, provided by the reaction, $3\ N_2H_4 \rightarrow N_2 + 4\ NH_3$. The resulting rate and amount of internal gas generation provided sufficient gas to reduce the leakage rate to 0.000014 cc ($1.4 \times 10^{-5}$ cc) per minute per psi of applied pressure differential.

Curve C shows the performance of the same slurry as that used in Curve A modified by the inclusion of hydrazine, ferric hydroxide and a catalytic amount of copper sulfate in proportions sufficient to provide 0.33 to 1.0 moles per liter hydrogen gas from a combination of the reactions:

The leakage prevention shown by curve C indicates that, with an internal gas generating system which reacted slightly faster than that of curve B, the externally pressurized gas flowed into the volume occupied by the slurry for about the first 4 hours and then, due to the rate and volume of the internal gas generation, inflow of external gas was first slowed and then stopped, within about 10 hours. For a period of from about 10 to 70 hours after the start of the test, the rate of gas generation was fast enough so that gas (probably inclusive of that which had previously flowed into the slurry-occupied volume) was gradually expelled back into the gas-occupied volume of the standpipe 6 of the test apparatus. The cement plug formed by this slurry did not permit any leakage of gas across it when a 300 psi differential was applied.

Shrinking Control at 250° F. and 5700 psig

Figure 6:
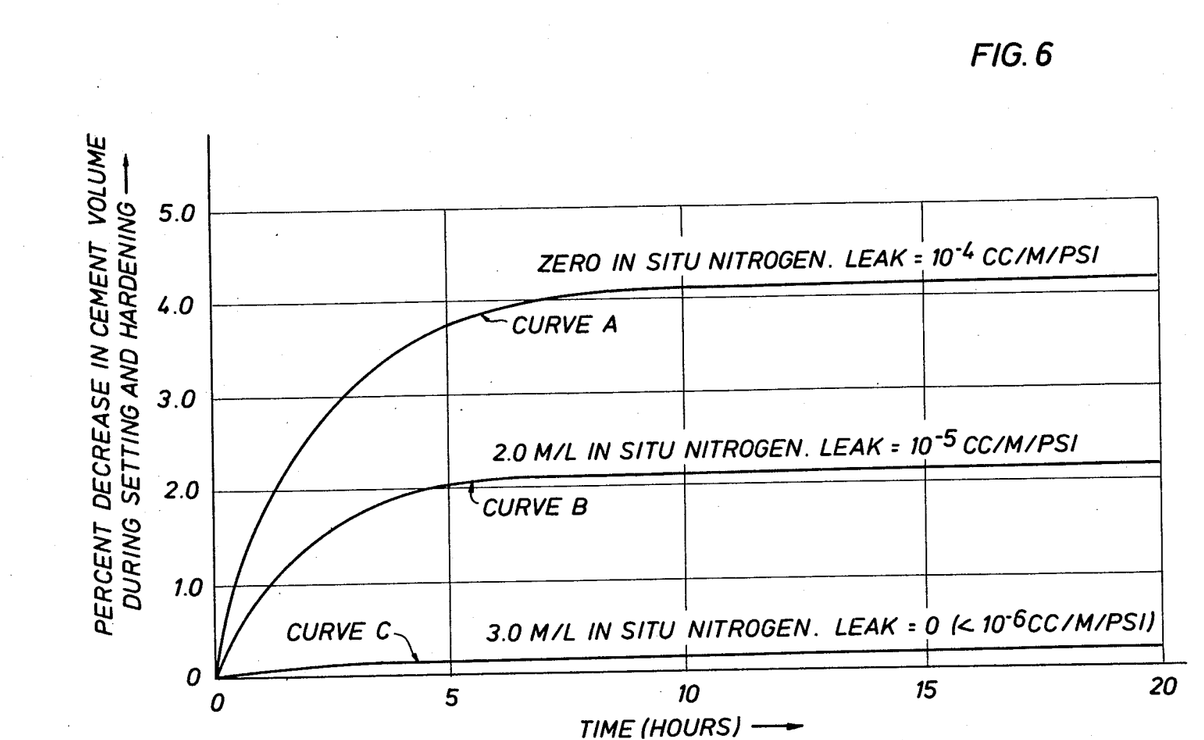
FIG. 6 shows percent decrease with time in the volume of a cement slurry during the setting and hardening of the cement.

FIG. 6 shows the graph of the percent decrease with time in the volume of hydraulic cement slurries being set at 250° in contact with a gas pressurized at 5700 psig. The curve A cement was formed from an aqueous liquid slurry of class H hydraulic cement free of gas-generating reactant. Within about 6 hours that slurry had shrunk by about 4% of its volume and, after about 20 hours, the leaking of the set and hardened cement was found to be relatively high, about $10^{-4}$ cc per minute per psig. The curve B cement had a composition which was the same except for the inclusion of hydrazine, ferric oxide and cupric sulfate in a ratio of moles per liter of, 2 to 1 to 0.1, for producing 2 moles per liter of nitrogen. The shrinkage of that slurry was only about 2% and its rate of gas leakage was only $10^{-5}$ cc per minute per psi. The curve C cement had a composition which was the same as that of the curve B cement except for a ratio of reactants of 3 to 1 to 0.1. The percent decrease in its volume was almost 0 and the leak rate was too small to be detected.

Controlling Gas Inflow at 140° to 180° F. and 2000 psig

Figure 7:
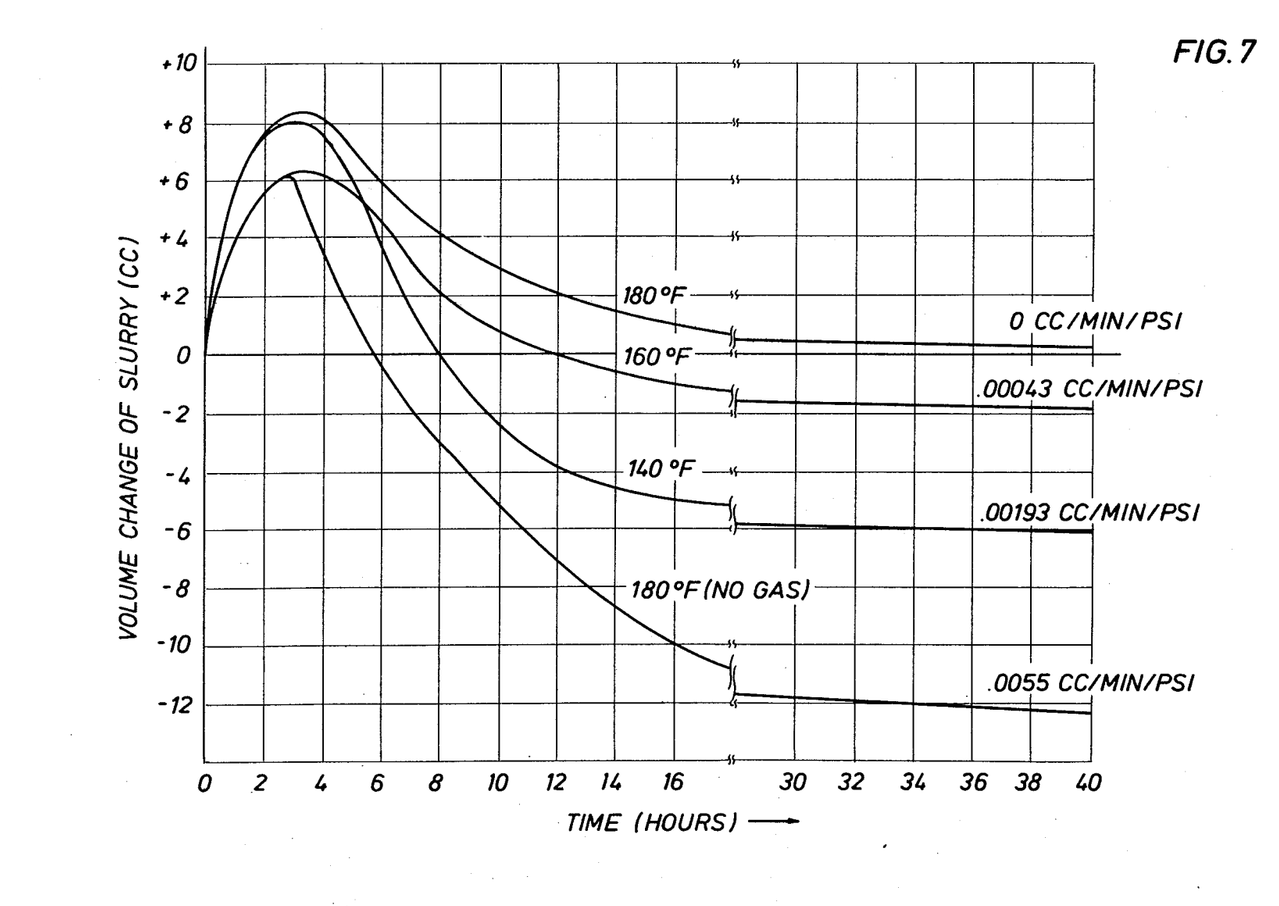
FIG. 7 shows the volume changes with time of various cement slurries while the cements are setting and hardening at various temperatures.

FIG. 7 shows a graph of the volume change with time of a cement slurry (amounting to the gas flow with time into and out of the slurry) while the gas is pressurized at 2000 psig and the slurry is being set at the temperature indicated. In each curve the slurry used was an aqueous slurry of Class H hydraulic cement having a pH of about 12 with and without an inclusion of 0.66 moles per liter of hydroxylamine (which is a nitrogen-generating reactant capable of providing 0.66 moles per liter of nitrogen gas). As shown by the curves of volume change and the rates of gas leakage after the cement had set and hardened at 140° F., in terms of cc per minute per psi, the leak rate was about 0.002. At 160° F. it was about 40 times less. At 180° F., the leak rate was substantially zero with the gas-generating reactant—but, without that reactant, the leak rate was 0.0055 cc per minute per psi.

These curves indicate the need for the gas-producing reactants to be both (1) capable of providing enough gas to compensate for the shrinkage of the slurry and (2) capable of providing that gas at a rate which is properly correlated with the temperature and pressure at which the cement is being cured (the magnitudes of which affect the rate of the hydrating and like reactions which are involved in the setting of the cement).

Various Gas Leak Test Results

The enclosed Table lists the results of various tests conducted in the manner described above (in the apparatus of FIG. 1) at temperatures ranging from 75° to 291° F. and pressures of 340 to 4000 psig. In such tests the cement slurries each contained Class H hydraulic cement and differed significantly only in the presence of the specified "reactant additives" for accomplishing or assisting the generation of the nitrogen gas. Each of the slurries contained from about 36 to 40% of water and 0 or 2% calcium chloride accelerator and 0 or 1% of HLX-C 249 fluid loss control agent. But the latter variations in composition have been found to cause little or no variation in the present type gas leak test results.

TABLE 1

| Test No. | Pressure (psig) | Temp. (°F.) | $N_2H_4$ (M/L) | Reactant-Additives | Gas Leak cc/Min/psi $0 = 1 \times 10^{-6}$ |
|---|---|---|---|---|---|
| 1 | 340 | 75 | 0 | 0 | $1.7 \times 10^{-2}$ |
| 2 | 340 | 75 | .075 | .113 $H_2O_2$ | 0 |
| 3 | 340 | 100 | .075 | .113 $H_2O_2$ | 0 |
| 4 | 340 | 100 | 0 | 0 | $9.7 \times 10^{-12}$ |
| 5 | 1000 | 75 | 0 | 0 | $2.9 \times 10^{-2}$ |
| 6 | 1000 | 75 | .225 | .338 $H_2O_2$ | 0 |
| 7 | 2000 | 120 | 0 | 0 | $1.0 \times 10^{-2}$ |
| 8 | 2000 | 120 | .45 | .68 $H_2O_2$ | 0 |
| 9 | 2000 | 180 | 0 | 0 | $5.7 \times 19^{-3}$ |
| 10 | 2000 | 180 | 0 | .66 $NH_2OH$ | 0 |
| 11 | 2000 | 200 | 0 | .66 $NH_2OH$ | 0 |
| 12 | 340 | 75 | .167 | .22 $K_2Cr_2O_7$ | 0 |
| 13 | 1000 | 100 | .167 | .22 $K_2Cr_2O_7$ | 0 |
| 14 | 2000 | 150 | .167 | .22 $K_2Cr_2O_7$ | 0 |
| 15 | 2000 | 200 | .167 | .22 $K_2Cr_2O_7$ | 0 |
| 16 | 2000 | 150 | 1.0 | 0 | $5 \times 10^{-2}$ |
| 17 | 2000 | 180 | 0 | 0 | $5.7 \times 10^{-3}$ |
| 18 | 2000 | 150 | 1.0 | 1.0 $Fe_2O_3$ & .05 $CuSO_4$ | $4.6 \times 10^{-2}$ |
| 19 | 2000 | 200 | 1.0 | 1.0 $Fe_2O_3$ & .05 $CuSO_4$ | 0 |
| 20 | 2000 | 200 | 0 | 1.0 $Fe_2O_3$ & .05 $CuSO_4$ | 0 |
| 21 | 2000 | 200 | 0 | 0 & .05 $CuSO_4$ | 0 |
| 22 | 2000 | 200 | 0 | 0      0 | $1.3 \times 10^{-2}$ |
| 23 | 2000 | 200 | 1.0 |  | $1.7 \times 10^{-5}$ |
| 24 | 2000 | 200 | 1.0 | 1.0 $Fe_2O_3$ & .1 $Cu_2O$ | 0 |
| 25 | 2000 | 200 | 1.0 | 0      .1 $Cu_2O$ | 0 |
| 26 | 4000 | 200 | 0 | 0      0 | $6.7 \times 10^{-6}$ |
| 27 | 4000 | 200 | 1.0 | 1.0 $Fe_2O_3$ & .1 $Cu_2O$ | 0 |
| 28 | 4000 | 200 | 0 | 1.0 $Fe_2O_3$   0 | $1.4 \times 10^{-4}$ |
| 29 | 4000 | 200 | 0 | 1.0 $Fe_2O_3$ & .1 $Cu_2O$ | $2.2 \times 10^{-5}$ |
| 30 | 4000 | 200 | 1.0 | 1.0 $Fe_2O_3$ & .1 $Cu_2O$ | $1.5 \times 10^{-5}$ |
| 31 | 4000 | 200 | 2.0 | 1.0 $Fe_2O_3$ & .1 $Cu_2O$ | 0 |
| 32 | 4000 | 266 | 2.0 | 1.0 $Fe_2O_3$ & .1 $Cu_2O$ | 0 |
| 33 | 4000 | 291 | 2.0 | 1.0 $Fe_2O_3$ & .1 $Cu_2O$ | 0 |

Note that tests of the type listed have involved anomalous results regarding the effect of copper. For example, in tests such as 18 to 22 and 28 to 30 regarding the iron and copper catalyzed reaction of hydrazine, it appears that when the hydrazine and the iron reactants were omitted, the copper alone had a significant effect on the amount of gas leakage which would occur. Such tests indicate that significant leakage prevention can be obtained by copper sulfate or cuprous oxide in concentrations of from about 0.5 to 0.7 moles per liter.

In general, the cement slurry-shrinkage and cement gas-leakage tests in accordance with this invention indicate the following regarding the suitability of a given cement slurry composition for use in forming a set cement at a given pressure and temperature. As temperature increases within a relatively low temperature range, so does the tendency for the cement to leak gas. Temperature usually has little or no effect above about 2000 psi. At temperatures above 120° F., increases in pressure tend to cause decreases in leak-rate, up to a significantly high pressure (e.g., probably between about 3000 and 4000 psi), and further increases in pressure have little or no effect. In the present type of gas-stabilization of cement slurries, where the gas-generating reactants are solutes within the aqueous liquid phase of the slurry, the present tests indicate that the sealing is better when the generation of a significant amount of gas is continued from about 10 to 20 hours, in order to prevent most of the shrinking of the slurry.

The approximate amount of gas which can be or need be included within a gas-stabilized cement which is formed at a given pressure and temperature can be readily calculated. For example, where hydrazine and hydrogen peroxide are the reactants, one mole of gaseous nitrogen is yielded by each mole of hydrazine. So, for example, assume that 40 grams of water (containing 0.1 m/l $N_2H_4$ and 0.2 m/l $H_2O_2$) will be mixed with 60 grams of cement (volume of cement=16 cc), when the reaction in the water is complete, 0.1 m/l of $N_2$ will form. For the total volume of cement slurry (40 cc $H_2O + 16$ cc cement = 56 cc), we have $$0.1 \text{ (M/L of } N_2) \times \frac{40(\text{cc of water})}{1000} =$$

.004 moles of $N_2$ gas/56 cc slurry.

Since 1 mol. of $N_2$ gas at 20° C. and 14.7 psi=24 liters gas, we calculate the following table:

| Pressure on Gas psi | Volume of Gas at 29° C., L | Total Volume of slurry | % Gas in Slurry |
|---|---|---|---|
| 14.7 (1 bar) | .004 × 24 = .094 | .094 + .056 = .150 | 63 |
| 147 (10 bar) | .004 × 2.4 = .0094 | .0094 + .056 = .0654 | 14 |
| 1470 (100 bar) | .004 × .24 = .00094 | .00094 + .056 = .0569 | 1.7 |

Thus, at a subterranean depth of about 3000 feet (at a pressure of 200 bar) the percentage of gas introduced into the cement would be less than about 1% of its volume. The suitability of such a cement slurry for use in a particular cement region at a particular pressure and temperature can be readily confirmed by the presently described cement slurry shrinking and leaking tests.

Suitable Compositions and Procedures

Suitable cements include substantially any cementous materials used in the form of an aqueous slurry containing suspended inorganic material which sets or cures to form an integral solid and relatively impermeable mass in a manner such that a significant proportion of the aqueous liquid is consumed by a conversion such as hydration reaction or sorption on solid materials during the formation of that solidified mass. The present invention is particularly useful in forming solidified hydraulic cements, particularly where the cement slurry contains substantially all, but not much more than, the amount of liquid that is so-consumed during the setting of the cement. Where the slurry is to be positioned in contact with porous materials such as subterranean earth formations, such slurries can advantageously contain fluid-loss materials such as those conventionally used in oil well cements. Similarly, such cement slurries can contain accelerators and/or retarders such as those conventionally used in oil well cements. The nitrogen gas-forming reactants should of course be selected so as to be compatible with all of the cement-forming compounds and additives which are to be included in the cement slurry.

Reactants suitable for generating the nitrogen gas in accordance with the present process can be substantially any which are water-soluble and capable of reacting while they are dissolved in an aqueous solution to produce nitrogen gas and by-products which are substantially inert to the components of an aqueous slurry of cement and the setting of the cement. Particularly suitable reactants are members of the group consisting of a mixture of hydrazine and hydrogen peroxide, hydroxylamine, a mixture of hydroxylamine and a water soluble chromate, a mixture of hydroxylamine and hydrogen peroxide, and a mixture of hydrazine and ferric hydroxide with a catalyst of chromium or copper salts.

With respect to the reactants, two types of concentrations are important. The concentration of the reactants within the aqueous liquid phase of the cement slurry affects the rate at which the reactants generate the gas at a given temperature. In general, the reaction rate increases with increases in concentration. The concentration of the reactants within the slurry as a whole affects the amount and thus the volume of the gas that is generated. The concentration within the slurry as a whole is affected by both the proportion of the reactants in the aqueous liquid and the proportion of the aqueous liquid in the slurry. For example, if the slurry contains only about 36% by weight of water, a greater concentration of reactants in the aqueous liquid is needed in order to generate a given amount of gas within the cement slurry than would be needed if the water content of the slurry were 40%. If the concentration of the reactants in the aqueous liquid is relatively high (e.g., in order to provide an adequate amount of reactant within the slurry as a whole), the kind of reactants and/or solution pH or catalyst, or the like, should be adjusted to compensate for the relatively rapid rate of reaction provided by the relatively high concentration.

What is claimed is:

1. In a well treating process in which an aqueous slurry of cement is pumped into a well to form a substantially impermeable set cement within a subterranean zone in which the temperature and pressure are relatively high, the improvement comprising using as said slurry:

a pumpable aqueous slurry of cement which contains dissolved within its aqueous liquid phase nitrogen-gas-generating reactants; and
   said reactants (a) consist essentially of compounds that react while dissolved within the aqueous liquid (b) have a rate of reaction and a concentration within the aqueous liquid such that the rate at which they generate the gas is relatively insignificant until their concentration within that liquid is increased by the loss of aqueous liquid which accompanies the setting of the cement and (c) are present within the cement slurry in a proportion such that the volume of the gas they are capable of generating substantially equals the volume lost by the cement slurry during the setting of the cement.

2. In a well treating process in which an aqueous slurry of cement is pumped into a well to form a substantially impermeable set cement within a subterranean zone in which the temperature and pressure are relatively high, the improvement comprising using as said slurry:
- an aqueous liquid slurry of cement which sets to form an integral body of set and hardened cement at said relatively high temperature and pressure;
- dissolved within the aqueous liquid phase of said slurry, reactants which react to form nitrogen gas while they are so dissolved; and
- the concentration of said reactants within said liquid, and the amount of gas which can be generated by said reactants, and the rate at which said reactants react at said selected temperature, being such that when the reactant-containing cement slurry is allowed to set at said relatively high temperature while it fills a portion of a rigid walled tube and is contacted by an externally pressurized gas having said relatively high pressure, the pressure and volume of the gas generated by said reactants prevents any significant shrinkage by the cement or any significant leakage of the externally pressurized gas past the set cement.

3. The process of claim 1 or 2 in which the cement is a hydraulic cement.

4. The process of claim 1 or 2 in which the reactants for generating nitrogen gas comprise at least one member of the group consisting of: a mixture of hydrazine and hydrogen peroxide, hydroxylamine, a mixture of hydroxylamine and a water-soluble chromate, a mixture of hydroxylamine and hydrogen peroxide, and a mixture of hydrazine and ferric hydroxide with a catalyst of chromium or copper salts.

5. A process for compounding an aqueous slurry of hydraulic cement and setting the cement within a zone into which the slurry is flowed and within which the pressure and temperature are high relative to those in which the slurry is compouned, comprising:
- compounding a pumpable aqueous slurry of hydraulic cement which is capable of being flowed into and set within the zone to be cemented;
- dissolving within the aqueous liquid phase of the slurry reactant compounds which are capable of reacting while dissolved in that liquid and react to produce nitrogen gas and by-products which are substantially inert to the components of the slurry and the setting of the cement;
- correlating the concentration of the reactants within the slurry as a whole with the pressure and temperature in the zone to be cemented so that the volume of the gas which the reactants produce, while reacting under those conditions, substantially equals the volume loss which the slurry undergoes while the cement is setting under those conditions;
- correlating the rate of reaction of the reactants and the initial concentration of the reactants within the aqueous liquid phase of the slurry with the temperature in the zone to be cemented so that, at that temperature and concentration, the amount of gas the reactants will produce before the cement becomes initially set at that temperature is significantly less than the amount the reactants will ultimately produce; and,
- flowing the reactant-containing slurry into the zone to be cemented and maintaining it substantially quiescent, so that, while the cement is setting and the volume of the aqueous liquid phase of the slurry is being reduced, the rate of the gas production is increased and the solidifying portions of the setting cement become both fluid impermeable and permeated with gas-filled, microscopically sized, clefts or creases which provide a bulk volume substantially equalling the initial bulk volume of the slurry.

6. The process of claim 5 in which the composition of said reactant-containing cement slurry is such that when allowed to set while it fills a portion of a rigid-walled tube and is maintained at the temperature of the zone to be cemented in contact with a gas which is externally pressurized at the pressure within the zone to be cemented, the pressure of the externally pressurized gas is initially transmitted throughout the slurry, the volume of the set cement is kept at least substantially equal to that of the slurry and, substantially as soon as the cement becomes initially set, the pressure and volume of the gas generated internally by said reactants is such that there is substantially no flow of the pressurized gas into or through the body of cement.

7. The process of claim 5 or 6 in which said reactant compounds comprise at least one member of the group consisting of: a mixture of hydrazine and hydrogen peroxide, hydroxylamine, a mixture of hydroxylamine and a water-soluble chromate, a mixture of hydroxylamine and hydrogen peroxide, and a mixture of hydrazine and ferric hydroxide with a catalyst of chromiun or copper salts.

8. The process of claim 5 or 6 in which said volume loss which said pumpable aqueous slurry of hydraulic cement undergoes while the cement is setting under the pressure and temperature of the zone to be cemented is measured by setting a portion of said slurry, free of said nitrogen-generating reactants, while said portion fills a portion of a rigid-walled tube, is maintained at the temperature of the zone to be cemented and is in contact with a body of gas pressurized at the pressure of that zone, and measuring the amount of said gas that flows into the slurry-occupied portion of the tube in response to the slurry volume loss during the setting of the cement.

* * * * *